United States Patent [19]

Kautz

[11] 4,005,959

[45] Feb. 1, 1977

[54] APPARATUS FOR PRODUCING SHAPED GLASS FIBER REINFORCED GYPSUM ARTICLES

[75] Inventor: Glenn E. Kautz, Sewickley, Pa.

[73] Assignee: H. H. Robertson Company, Pittsburgh, Pa.

[22] Filed: Feb. 27, 1976

[21] Appl. No.: 661,867

Related U.S. Application Data

[63] Continuation-in-part of Ser. No. 484,304, June 28, 1974, abandoned.

[52] U.S. Cl. .............................. 425/112; 425/371; 425/383; 425/296; 425/304

[51] Int. Cl.² ..................... B29C 3/00; B29C 17/00

[58] Field of Search ............ 425/112, 83, 371, 383, 425/304

[56] References Cited

UNITED STATES PATENTS

| | | | |
|---|---|---|---|
| 2,609,539 | 9/1952 | Shearer | 425/112 X |
| 2,931,063 | 4/1960 | Harris | 425/112 X |
| 3,242,527 | 3/1966 | Rosenberg | 425/371 |
| 3,738,895 | 6/1973 | Paymal | 425/83 X |

*Primary Examiner*—J. Howard Flint, Jr.
*Attorney, Agent, or Firm*—Harry B. Keck; George E. Manias

[57] ABSTRACT

Apparatus for forming shaped articles from glass fiber reinforced gypsum. An aqueous slurry of calcium sulfate hemihydrate, water and glass fibers contains between 22 and 45 parts by weight water, 100 parts by weight calcium sulfate hemihydrate and 3 to 10 parts by weight glass fiber. The slurry is provided as a continuous ribbon on a moving, water-impermeable first membrane. A water-impermeable second membrane is applied above the continuous ribbon and sealed along its side edges to the side edges of the first membrane to form a sandwich consisting of the two membranes and the slurry ribbon.

The sandwich is shaped prior to the setting of the gypsum and is retained in the desired shape until initial setting occurs. Thereafter at least a portion of one of the two membranes is removed and substantially all of the uncombined water is removed from the shaped ribbon.

4 Claims, 13 Drawing Figures

APPARATUS FOR PRODUCING SHAPED GLASS FIBER REINFORCED GYPSUM ARTICLES

CROSS-REFERENCES TO RELATED APPLICATIONS (IF ANY)

This application is a continuation-in-part of my co-pending application Ser. No. 484,304 filed June 28, 1974, now abandoned.

BACKGROUND OF THE INVENTION

1. Field of the Invention

The invention relates to shaped articles formed from glass fiber reinforced gypsum and more particularly to apparatus for making such shaped articles.

2. Description of the Prior Art

Gypsum has been used as a casting and molding material for many years. Gypsum is known as hydrated plaster of Paris which is the hemihydrate of calcium sulfate. One hundred parts by weight of the calcium sulfate hemihydrate combined stoichiometrically with 18.6 parts by weight of water to form a hard, set plaster containing two mols of combined water. In order to prepare a workable, pumable, moldable composition, the calcium sulfate hemihydrate is combined with an excess of water in addition to the 18.6 parts by weight which are required for the conversion of the hemihydrate into a set plaster. With ordinary calcined calcium sulfate hemihydrate, also known as beta hemihydrate, the calcium sulfate hemihydrate is combined with more than 50 percent of its weight of water in order to achieve a pouring consistency. It is possible to achieve a pouring consistency with less than 50 percent water when the calcium sulfate hemihydrate is in the form of crystalline calcined calcium sulfate hemihydrate also known as alpha hemihydrate. See U.S. Pat. No. 1,901,051 - RANDEL et al. Moldable compositions containing 40 parts of water for every 100 parts of dry powder (predominantly alpha hemihydrate) have been described. See U.S. Pat. No. 2,494,403 - NIES et al.

Structurally reinforced articles formed from gypsum and glass fibers have been described wherein the glass fibers are mixed into a slurry of calcium sulfate hemihydrate and water. See U.S. Pat. No. 3,062,670 - MARZOCCHI et al; U.S. Pat. No. 2,681,863 - CROCE et al and U.S. Pat. No. 3,147,127 - SHANNON. In all of these glass fiber reinforcement processes involving preparation of a slurry containing glass fibers, the act of mixing the fibers introduces a tendency to break the fibers into short lengths. It has been reported that 0.1 percent of textile fibers (diameter 0.004 inch) cannot be admixed with the calcium sulfate hemihydrate slurry whereas 3 percent of larger diameter fibers (0.003 inch) can be added to a moldable calcium sulfate hemihydrate slurry with ease. See U.S. Pat. No. 3,062,670 supra.

A significant development in glass fiber reinforced gypsum technology is set forth in British patent No. 1,204,541 - National Research Development Corporation. The significant new development avoids mixing of glass fibers in a calcium sulfate hemihydrate slurry but instead prepares an admixture of calcium sulfate hemihydrate, water and glass fibers by spraying an aqueous slurry of the calcium sulfate hemihydrate into a stream of freshly chopped glass fibers or onto a preformed mat formed from randomly oriented glass fibers. Glass fiber reinforced gypsum is known as GRG.

In order to achieve adequate wetting of the glass fibers in the British process, a substantial excess of water is employed in the aqueous slurry--that is an excess over the stoichiometric amount required to combine with the calcium sulfate hemihydrate. Slurries containing 50 parts by weight of water and 100 parts by weight calcium sulfate hemihydrate are contemplated. Water-to-calcium sulfate hemihydrate weight ratios of 0.4 to 0.6 are described, J. Materials Science, Vol. 4(5), May 1969, pp. 389–395. The British patent process thus prepares a watery slurry containing calcium sulfate hemihydrate and glass fibers. An essential feature of the British process is the deliberate removal of excess water prior to the setting of the plaster mixture. The excess water is initially removed by vacuum removal or by pressure to produce a composition which still contains an excess of water over the stoichiometric amount required for the calcium sulfate hemihydrate and contains enough water to provide a moldable and workable plaster which exists for a short period of time until the gypsum becomes set. The removal of the excess water is a difficult task. One technique for removing the water has been to form the dilute slurry on a porous membrane, such as a sheet of Kraft paper, and to pass the porous membrane containing the dilute slurry over a suction box which has facilities for extracting water from the dilute slurry through the pores of the Kraft paper. Nonetheless, the British patent process is capable of producing glass fiber reinforced gypsum articles of remarkable strength characteristics as a result of retaining relatively long length glass fibers in a random orientation in the final article.

It would certainly be desirable to eliminate the cumbersome and expensive water removal stage which is necessitated in the process described in the British patent. It is also desirable to develop a process for producing a glass fiber reinforced gypsum articles on a continuous basis in a variety of profiled shapes. Such profiled shapes can be employed in producing products of the type described in U.S. Pat. Nos. 3,842,559; 3,839,836, which are assigned to an assignee of the present invention. The profiled shapes also can be employed to produce liner sheets for building construction panels as will be hereinafter described.

SUMMARY OF THE INVENTION

One object of the invention is to provide apparatus for producing structural shapes and products from glass fiber reinforced gypsum. A further object is to provide apparatus which employs relatively concentrated aqueous slurry of calcium sulfate hemihydrate, and particularly slurries which can be molded and shaped without requiring an intermediate stage for elimination of excess water. A further object is to provide an apparatus for producing continuously shaped articles from glass fiber reinforced gypsum.

Specifically, the present articles are fabricated from a slurry which contains 100 parts by weight calcium sulfate hemihydrate; 22–45 parts by weight water; 3 to 10 parts by weight glass fibers.

The calcium sulfate hemihydrates may be alpha hemihydrate, beta hemihydrate, or a mixture of the two. The alpha hemihydrate is preferred, despite its greater expense, because it permits molding of the resultant materials with less water content. The beta hemihydrate is desirable because of its low initial cost. A compromise between cost and performance suggests a mixture of alpha hemihydrate and beta hemihydrate as a useful composition.

The glass fibers preferably are provided in the form of chopped glass roving of any conventional glass fiber having a diameter ranging from 0.0003 to about 0.005 inch. The fiber length should average from ½ to 4 inches. Chopped glass fiber roving from a chopper set to cut 1½-inch to 2-inch lengths is optimum. The glass fibers also may be provided in the form of a preformed randomly oriented glass fiber mat.

The slurry also may contain other functional additives for purposes well-known in the gypsum arts, for example, setting retarders such as calcium oxide, sodium hydroxide; and accelerators such as phosphoric acid, sulfuric acid; inorganic pigment; fillers such as ground silicon, asbestos, mica, fully hydrated gypsum; and sizing materials such as water-soluble animal glue.

In accordance with this invention, it has been discovered that adequate wetting of glass fiber reinforcement can be achieved with relatively concentrated aqueous slurries of calcium sulfate hemihydrate. The resulting slurry of aqueous calcium sulfate hemihydrate and glass fibers can be formed and shaped so long as there is only limited migration of the glass fibers after they have been randomly deposited. The glass fibers are deposited on a moving water impermeable membrane such as a film of polyethylene. Preferably the impermeable membrane is a thermoplastic substance which can be heat sealed along its edges to the edges of a second similar water impermeable membrane. After the glass fibers and aqueous calcium sulfate hemihydrate slurry are deposited on the water impermeable membrane, a second water impermeable membrane lies above the deposited ribbon of slurry.

The thickness of the deposited calcium sulfate hemihydrate slurry and glass fibers is about 1/16-inch to about 2 inches. It is within the scope of this invention to apply ribbons of aqueous calcium sulfate hemihydrate slurry and glass fiber which have differential thicknesses across the width. When the second membrane is heat sealed along its edges to the edges of the first membrane, a sandwich results consisting of the aqueous calcium sulfate hemihydrate slurry containing glass fibers between the two membranes. The sandwich is lightly squeezed beneath a roller or a skid to urge the elimination of any entrained gas bubbles within the envelope formed by the two heat sealed membranes. Thereafter, the sandwich is drawn through forming equipment which shapes the sandwich into its desired profile without excessive migration of the individual glass fibers. The shaping equipment may include rollers which "work" the sandwich in the manner of pastry rollers to produce a uniform thickness. The equipment alternatively may provide for selective strips of relatively thick and relatively thin dough to accommodate differential thickness requirements in the final product. The forming equipment also may include sloping surfaces along the edges and/or the central part of the ribbon to shape the profile of the ribbon as desired. When the sandwich is formed into its ultimately desired profile, the forming equipment thereafter, along the direction of movement of the sandwich, retains a constant profile until the aqueous calcium sulfate hemihydrate slurry has become set. After an initial set occurs, the sandwich can be maintained and supported in its newly formed profile. Thereafter, at least a portion of one of the membranes is removed. Preferably one entire membrane is removed. This is preferably accomplished by employing side cutting saws to trim the side edges of the resulting product and to cut through both of the two membranes inside the heat sealed edges. This facilitates the removal of one of the membranes. Thereafter, the uncombined water of the now set aqueous calcium sulfate hemihydrate slurry is removed, preferably by passing the shaped article with one of the membranes intact through a heating station at a sufficient temperature and for a sufficient time to accomplish the dehydration. The continuous shaped article may be cut to length by a suitable guillotine or travelling saw either before or after removal of a part of one of the membranes and either before or after the dehydration stage.

The resulting products can be fabricated to surprisingly close dimensional tolerances and can be produced with exceptional strength characteristics.

A preferred apparatus for producing the present glass fiber reinforced articles includes a continuous work table having facilities such as driven rollers for advancing a water impermeable membrane and a slurry sandwich formed between two water impermeable membranes. The apparatus includes spool means for delivering the two membranes, glass fiber depositing means and aqueous clacium sulfate hemihydrate slurry spraying means. The glass fiber depositing means may include a chopper for glass fiber roving which will be positioned above the work table. The glass fiber depositing means may include alternatively or in addition one or more spools of preformed randomly oriented glass fiber mat. And the preferred embodiment, a chopper for glass fiber roving is employed to produce a descending stream of discrete glass fibers having an average length of from about ½ inch to about 4 inches. An oscillating spray nozzle is provided to impinge a slurry stream against the downwardly moving stream of chopped glass fibers to accomplish some wetting of the fibers while they remain airborne. The glass fibers and oscillating aqueous calcium sulfate hemihydrate spray nozzle are designed to operate between a pair of side walls. The side walls have rubber squeegee bottom edges which are in surface engagement with the bottom water impermeable membrane and slightly inboard of the side edges of the membrane. The second water impermeable membrane is rolled onto the top of the deposited ribbon of aqueous calcium sulfate hemihydrate slurry containing the glass fiber reinforcement. The second membrane is wider than the ribbon, that is wider than the spaces between the two side walls so that the marginal edges of the second membrane are disposed above the marginal edges of the first membrane. Immediately upon leaving the side walls with the squeegee bottom edges, the sandwich is heat sealed along its side edges to preclude exudation of the slurry between the side edges of the two membranes. As the sandwich is advanced along the work table, a compressive stress is applied to iron out any entrained gas from the interior of the envelope which is defined by the two membranes.

Thereafter the work table extends linearly for sufficient distance to develop an initial set in the advancing sandwich. The time required to develop the initial set is a function of the retarders, accelerators, and physical characteristics of the calcium sulfate hemihydrate. The speed of the advancing sandwich is regulated according to the time required for an initial set so that the sandwich will be self-sustaining at the end of the work table.

At the far end of the work table, means are provided for removing at least a portion of one of the two membranes. Means may be provided for trimming the side edges of the sandwich. Means are also provided for cutting to length the continuous ribbon of profiled product. Means are provided for extracting substantially all of the combined water from the profiled final product.

BRIEF DESCRIPTION OF THE DRAWINGS

FIG. 1 is presented in two sketches which are to be connected along the broken lines I—I.

FIGS. 2–12 illustrate partly in cross-section the sequential processing of glass fiber reinforced ribbons of the apparatus in FIG. 1.

DESCRIPTION OF THE PREFERRED EMBODIMENT(S)

Figure 1:
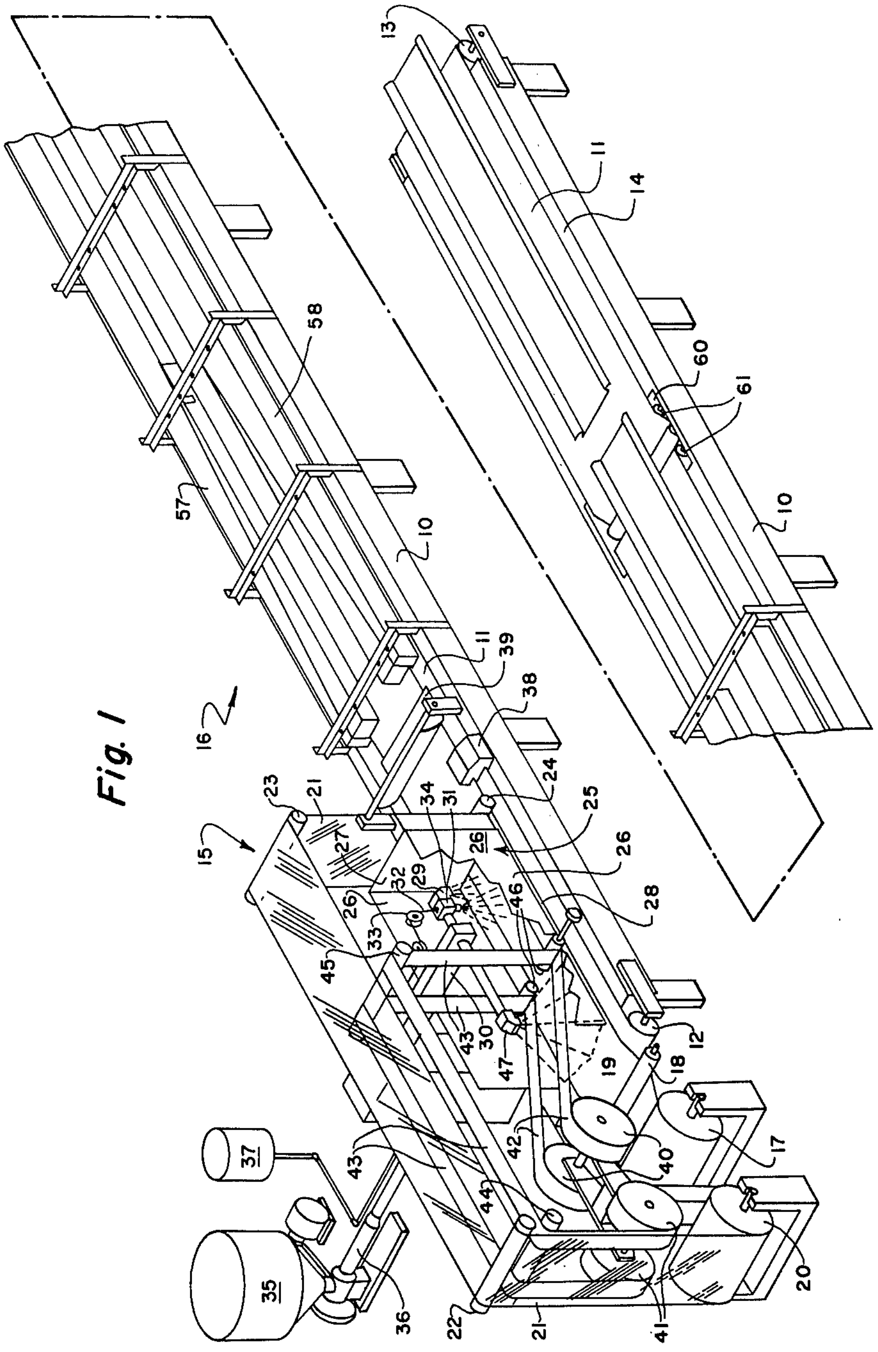
FIG. 1 is a perspective illustration of apparatus for practicing the process.

The apparatus of FIG. 1 includes a work table 10 which may be covered with a continuous moving belt 11 passing from a belt roller 12 to a belt roller 13 at the exit end. The work table 10 also has a smooth flat upper surface 14 over most of its length on which the upper surface of the moving belt 11 lies. A GRG fabricating station 15 is provided at the inlet end of the work table 10. A product shaping assembly station 16 is provided in the intermediate part of work table 10 and is indicated generally by the numeral 16.

Within the GRG forming station 15, there is preferably provided a first spool 17 of water impervious membrane such as polyethylene film, polyvinyl fluoride film polethyleneterephthalate film, cellulose acetate film. The free end of the membrane is withdrawn from the spool 17 and is smoothed during passage beneath a smoothing roll 18 and thereafter laid down as a continuous first membrane strip 19 on the conveyor belt 11. The first membrane strip passes continuously over the work table 10 to the exit belt roller 13.

A second membrane spool 20 delivers a second membrane strip 21 over guiding smoothing rolls 22, 23, 24 until the second membrane strip 21 is deposited above the first membrane strip beneath the smoothing and guide roll 24. The second membrane strip 21 thereafter passes along the work table 10 to the exit belt roller 13. A spray enclosure 25 is formed from two side walls 26 and a transverse wall 27. Side walls 26 are equipped at their bottom with a resilient edge seal 28 which is maintained in sliding surface contact with the first membrane strip 19 as the first membrane strip 19 advances along the work table 10. The engagement between the resilient edge seal 28 and the first membrane strip 19 is adequate to preclude any significant movement of water between them. An oscillating spray head 29 is mounted for transverse oscillation within the spray enclosure 25 by means of an oscillating arm 30. The oscillating spray head 29 includes a chopper 31 for glass fiber roving 32 which is delivered to the spray head 29 over a pulley 30, 31. The roving 32 is delivered as a strand from a source (not shown in FIG. 1) outside the spray enclosure 25. The oscillating spray head 29 also includes a nozzle 34 for delivering a spray of aqueous calcium sulfate hemihydrate slurry which impinges against the cloud of glass fibers which is produced by the glass fiber roving chopper 31.

The aqueous calcium sulfate hemihydrate slurry is produced in a hopper 35 and is delivered as a slurry by means of a positive displacement pump through appropriate piping to a spray nozzle 34.

When accelerators are employed to adjust the setting time of the aqueous calcium sulfate hemihydrate slurry, the accelerators can be provided in a suitable storage tank 37 from which they can be injected into the slurry feed line after the slurry has left the positive displacement pump 36.

Typical operation of the GRG forming station 15 will now be described.

A supply of aqueous calcium sulfate hemihydrate and a supply of chopped glass fibers are delivered from the oscillating spray head 29 onto the upper surface of the first membrane strip 19 between the two spray enclosure side walls 26. The oscillating spray head 29 moves transversely across the width of the first membrane 19 depositing a layer of fully wetted glass fibers and aqueous calcium sulfate hemihydrate. The water content of the calcium sulfate hemihydrate slurry is maintained at 22 to 45 weight percent. The thickness of the glass fiber-slurry ribbon ranges from about 1/16 inch to about 2 inches but preferably from about 1/16 to about ½ inch. By providing a variable speed drive for the oscillating arm 30, the oscillating spray head 29 can be made to dwell at selected points along the path of oscillation to generate bands of increased thickness ribbon corresponding to the dwell location.

After the glass fiber and slurry ribbon has been deposited on the first membrane 19, the second membrane 21 is supplied above the ribbon and overlapping the ribbon along each side. The smoothing and guiding roll 24 may be equipped with recesses corresponding to increased thickness bands which may be provided in the ribbon of slurry and glass fibers.

The membranes 19, 21 preferably are formed from heat-sealable plastic materials. Appropriate edge sealing devices 38 are located on the side of work table 10 downstream from the guiding roll 24 to provide a water impermeable edge seal between the edges of the membranes 19, 21. A weighted skid 39 (as shown) or a suitable roller is provided to squeeze out entrapped gases which may be present in the envelope formed by the two heat sealed membranes 19, 21. The entrapped gases are readily discharged between the two heat sealed membranes 19, 21 in the direction of the starting end of the work table 10.

In a preferred embodiment of the invention, the GRG forming station 15 also includes facilities for depositing lateral strips of preformed randomly oriented glass fiber mats. As shown in FIG. 1, the lateral strips of preformed mats are provided in a pair of first glass fiber mat spools 40 and in a pair of second glass fiber mat spools 41. The strips of randomly oriented glass fiber mats 42 are withdrawn from the first spools 40 and laid down on top of the first membrane strip 19 adjacent to the resilient bottom edge seal 28 of the spray enclosure side walls 26.

Second randomly oriented glass fiber strips 43 are withdrawn from the second spools 41 and delivered over guide rolls 44, 45, onto the top of the first randomly oriented glass fiber strips 42 beneath a guide roll 46.

A second aqueous calcium sulfate hemihydrate slurry spray nozzle 47 is provided upstream from the first spray nozzle 34 but secured to the same oscillating arm 34. The second spray nozzle 47 deposits an aqueous calcium sulfate hemihydrate slurry onto the first randomly oriented glass fiber strip 42. The second slurry spray nozzle 47 also deposits a layer of aqueous calcium sulfate hemihydrate slurry directly onto the first membrane 19 to minimize glass fiber blooming over the surface of the resulting article which is next to the first membrane 19.

The first and second randomly oriented glass fiber strips 42, 43 serve to reinforce the edges of the resulting article in a manner which will be hereinafter more fully described.

It should be understood that the randomly oriented first and second glass fiber strips 42, 43 can be omitted and that the resulting article can be fabricated solely from the glass fiber strands which are introduced from the chopper 31. Alternatively, the chopper 31 can be eliminated or inactivated and the entire glass fiber component of the resulting article can be supplied in the form of a strip of randomly oriented glass fiber mats supplied in the manner of the first and second fiber strips 42, 43.

Having described the alternative embodiment including the reinforcing randomly oriented first and second glass fiber strips 42, 43, it is now possible to describe the cross-sectional views 2 through 12 inclusive.

Figure 2:
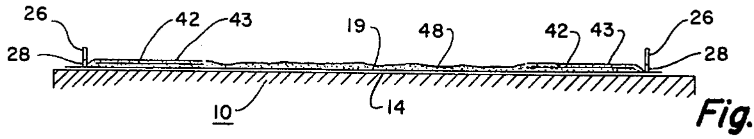
FIGS. 2–11 are cross sectional illustrations taken along the lines 2—2, 3—3, 4—4, 5—5, 6—6, 7—7, 8—8, 9—9, 10—10, and 11—11 of FIG. 1*a*.
Figure 3:
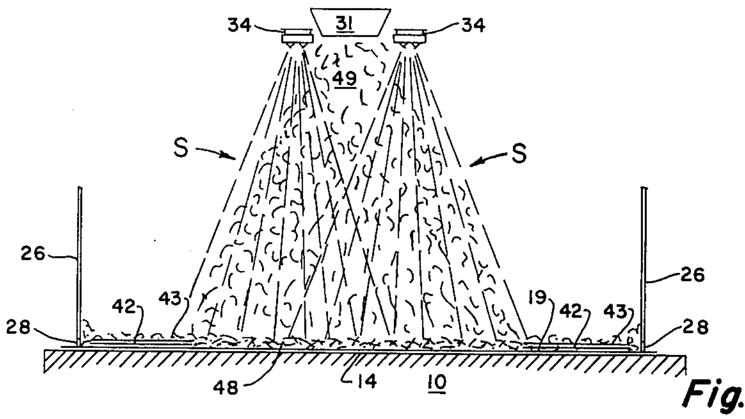
Figure 4:
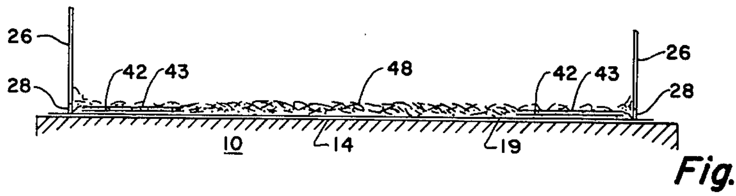
Figure 5:
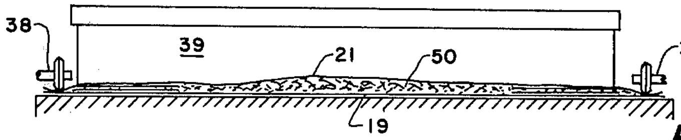

The cross-sectional view in FIG. 2 illustrates the top surface 14 of the work table 10 on which a bottom membrane 19 is positioned in the slideable relation. As shown in FIGS. 2 through 12, the conveyor belt 11 is omitted. This can be accomplished where the upper surface 14 of the work table 10 is smooth and slippery and where the first membrane 19 readily slides over that surface 14. The randomly oriented glass fiber mat strips 42, 43 are positioned on top of the first membrane 19 adjacent to the resilient bottom edge seal 28 of the spray enclosure side walls 26. A ribbon 48 of the aqueous slurry is applied on top of the first membrane 19 to serve as a surfacing coating and also to wet out the randomly oriented glass fiber strips 42, 43. As the first membrane 19 advances along the work table to the position shown by the line 3—3, it will be observed from FIG. 3 that a cloud 49 of chopped glass fiber strands descends from the chopper 31 onto the first membrane 19. One or more sprays S of aqueous calcium sulfate hemihydrate slurry is directed from the calcium sulfate hemihydrate spray nozzle 34 into impingement with the cloud 49 in order to wet out the individual glass fibers. The combination of glass fibers and slurry increases the thickness of the ribbon 48. The final profile of the components as they exit from the spray enclosure 25 is shown in FIG. 4.

After the first membrane 19 and the materials carried thereon pass beneath the guiding roll 24, the second membrane 21 is applied above the calcium sulfate hemihydrate slurry and glass fibers in such a manner that the edges of the second membrane 21 overlie the edges of the first membrane 19 to permit sealing two edges together by means of any available edge sealing equipment 38. Customarily, the membranes 19, 21 are fabricated from thermoplastic materials which can be fused together by localized heating. The skid 39, seen in FIG. 5, urges any entrapped gas bubbles out of the sandwich which is formed consisting of the two membranes 19, 21, and the glass fiber and slurry.

Figure 6:
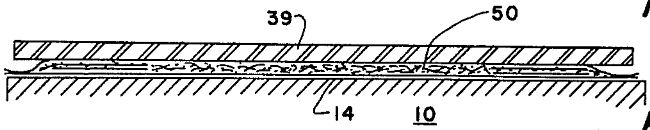

The skid 39, as shown in FIG. 6, also serves to level out the sandwich, identified herein for convenience by the numeral 50.

Figure 7:
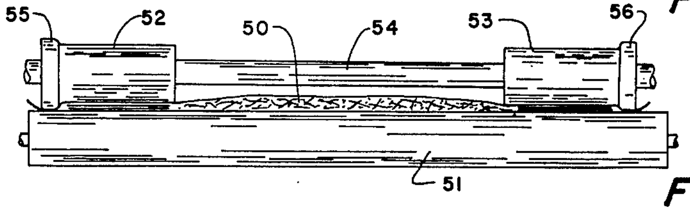

FIG. 7 illustrates a sizing roll assembly which does not appear in FIG. 1. The sizing roll assembly of FIG. 7, if employed, would be provided after the gas bubble removal skid shown in FIGS. 5 and 6. The purpose of the sizing roll assembly in FIG. 7 is to provide a predetermined thickness in the GRG sandwich 50 along its edges to facilitate the shaping of the edges. Specifically a bottom roll 51 is provided in a recess in the upper surface of the work table 10 (not shown in FIG. 1). A pair of edge sizing rolls 52, 53 is mounted on a common shaft 54. The edge sizing rolls 52, 53 are equipped respectively with shoulders 55, 56. The spacing between the main body portions of the head sizing rolls 52, 53 and the bottom roll 51 determine the thickness of the sandwich 50 at the side edges thereof. Preferably the roller 51 and the shaft 54 are driven at a peripheral velocity which coincides with the linear velocity of the sandwich 50 along the work table.

The sandwich 50 is now already for structural shaping in the product shaping station 16. The product shaping station 16 is equipped with guide ways having gradually sloping and tapering pockets for receiving the lateral edge portions of the sandwich 50. The guide ways are illustrated in FIG. 1 by the numbers 57, 58. The two guide ways may be identical or they may be different as shown in the preferred embodiment of this invention. The length of the guide ways 57, 58 is sufficient to permit the GRG sandwich 50 to develop an initial set before leaving the exit end of the guide ways. The time required for developing the initial set, as already set forth, is determined by the composition of the aqueous calcium sulfate hemihydrate slurry, i.e., the retarder and accelerator content. The initial set time and the linear velocity of the sandwich 50 over the work table 10 determines the required minimal length of the product shaping station 16.

Figure 8:
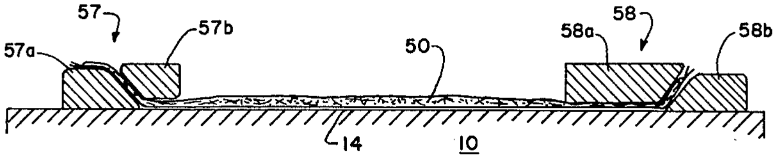
Figure 9:
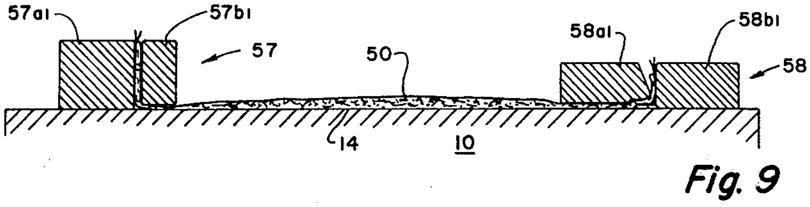
Figure 10:
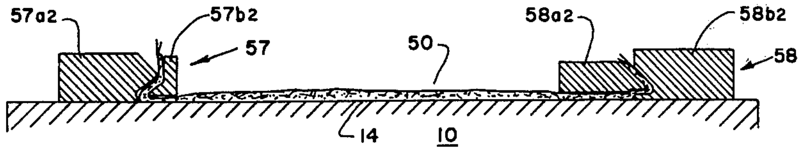
Figure 11:
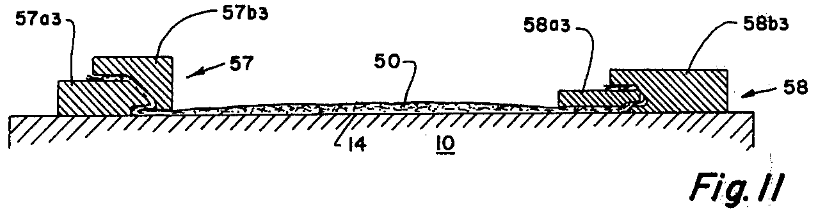

In FIG. 8 through 12, the formation of a particular profile will be described. The profile is intended for use as a linear sheet in a building construction panel. As seen in FIG. 8, the left-hand side of the sandwich 50 is formed in the guide ways 57 between a pair of guide shoes **57*a*, 57*b*. The lateral edge is gradually elevated above the surface 14 of the work table 10. In FIG. 9, the guide shoes 57*a*1 and 57*b*1 further elevate the lateral edge to the vertical position with respect to the surface 14 of the work table 10. In FIG. 10 the guide shoes 57*a*2, 57*b*2 introduce a re-entrant flange into the side edge of the sandwich 50. In FIG. 11, the guide shoes 57*a*3, 57*b*3** compress the re-entrant flange and form an outwardly open channel.

The right-hand edge of the sandwich 50 meanwhile is being shaped into a corresponding configuration by means of guide shoes **58*a*, 58*b* of FIG. 8; guide shoes 58*a*1, 58*b*1 of FIG. 9; guide shoes 58*a*2, 58*b*2 of FIG. 10; and guide shoes 58*a*3, 58*b*3 of FIG. 11**.

As shown in FIGS. 8, 9, 10 and 11, the central portion of the ribbon 50 between the guide ways 57, 58 is essentially flat. If central shaping is desired, appropriate guide ways can be provided.

In the embodiment illustrated in FIGS. 8, 9, 10, 11, the thickness of the sandwich 50 in the marginal edges which are formed in the guide ways 57, 58 is about one-sixteenth inch. The sandwich 50 between the guide ways 57, 58 ranges from about 1/16 inch to about ⅛ inch in thickness.

Figure 12:
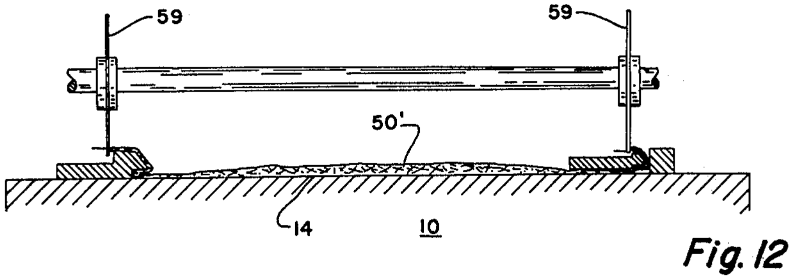
FIG. 12 is a cross-sectional illustration taken along either line 12*a* or line 12*b*.

After the shaped profile of FIG. 11 has been formed, the guide ways 57, 58 retain the profile of the guide shoes 57*a*3, 57*b*3, 58*a*3, 58*b*3 as the sandwich 50 continues to advance through such guide ways until the sandwich 50 has developed an initial set. Thereafter, the marginal edges of the shaped, initially set sandwich 50', as shown in FIG. 12, are trimmed by means of rotating saw blades 59 which preferably comprise carborundum discs. The edge trimming station shown in FIG. 12 is not illustrated in FIG. 1. The reason for not illustrating station 12 in FIG. 1 is that the edges may be trimmed while the set ribbon 50' remains a continuous strip, or the edges may be trimmed after the continuous set ribbon 50' has been cut-to-length by means of cut-to-length transverse saws.

Figure 1A:
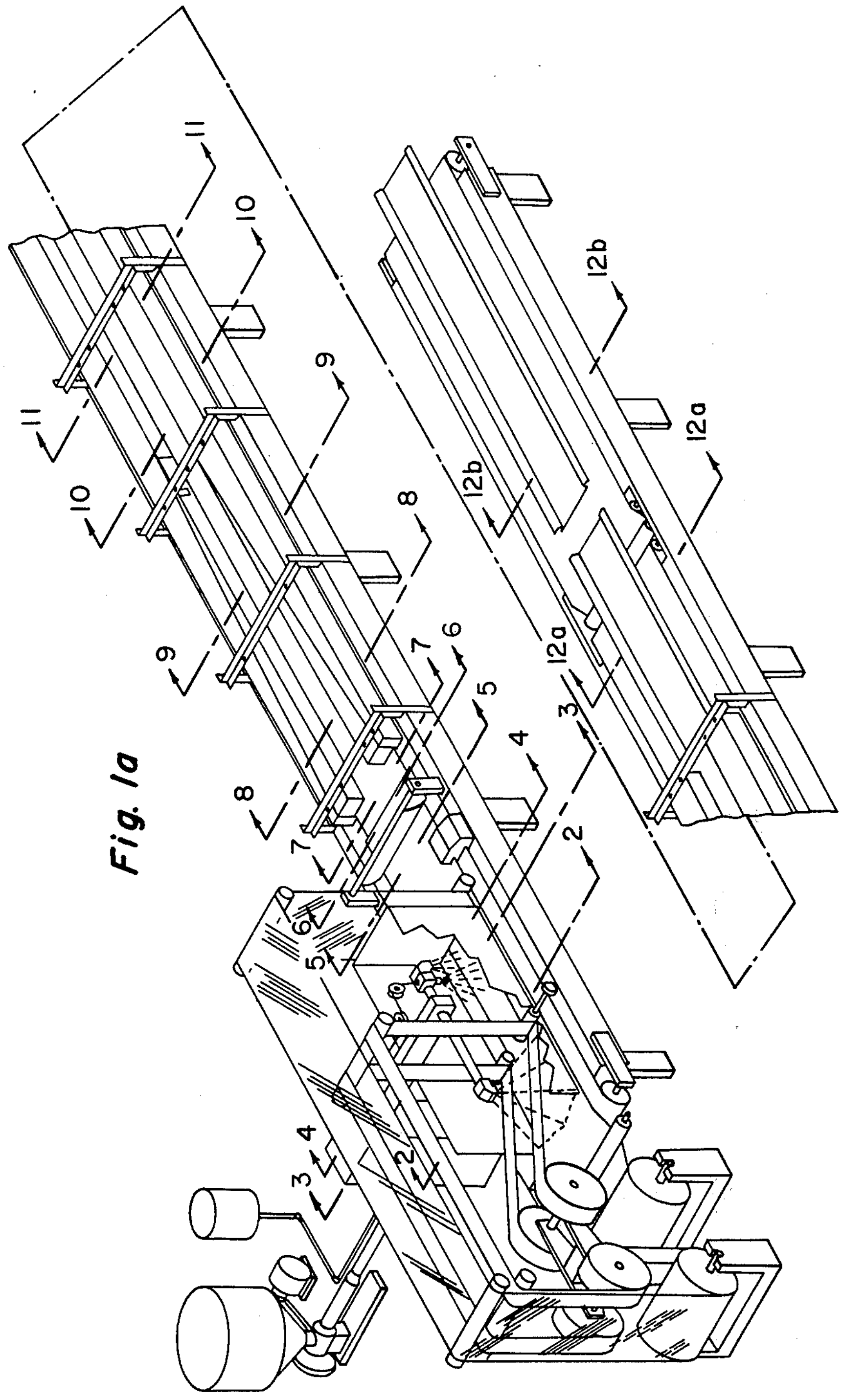
FIG. 1*a* is the same as FIG. 1 with section lines drawn to indicate sections which are illustrated in FIGS. 2–12 inclusive.

As shown in FIG. 1, an opening 60 is provided in the surface 14 of the work table 10. Positioned within this opening 60 (and not shown in FIG. 1) is a transversely oscillating cut-to-length saw of any convenient design. The saw moves transversely across the work table 10 in the recess 60. Where a conveyor belt 11 is employed, the conveyor belt may be continuously drawn into the recess 60 by means of appropriate rollers 61 shown in FIG. 1. The edge trimming structure of FIG. 12 may be provided before or after the recess 60, that is, either at line 12*a* or line 12*b* of FIG. 1*a*.

The resulting products preferably are dried to remove substantially all of the uncombined water. This is accomplished by removing at least a portion of the membranes 19, 21 to admit dehydration in an oven, not shown. Preferably the entire inner membrane is removed prior to dewatering and the entire outer membrane is retained on the product through subsequent fabrication, packaging, shipping, and erection to retard physical damage and to keep the unit clean.

SUMMARY

The present apparatus permits rapid production of GRG products with useful profiles and does not require the use of dilute calcium sulfate hemihydrate slurries which demand complex subsequent dewatering before the unset GRG may be shaped.

I claim:

1. Apparatus for forming glass-fiber reinforced gypsum products comprising:

a. an assembly table;

b. means for delivering a first continuous, water-impervious membrane to the top of the said assembly table;

c. means for delivering as a ribbon a mixture of aqueous calcium sulfate hemihydrate and glass fibers to the top of the said first membrane, said mixture having a weight ratio of water to hemihydrate of 0.22 to 0.45;

d. means for delivering a second continuous water-impervious membrane above the said first membrane and above the said ribbon;

e. means for sealing together continuously the side edges of the said first membrane and the said second membrane to produce a continuous sandwich having a continuous water-impervious periphery about the said ribbon;

f. means for shaping the said sandwich into a desired profile;

g. means for retaining the said sandwich in the desired profile until the said ribbon has set; and h. means for cutting the said sandwich transversely across its width into sections of desired length.

2. Apparatus of claim 1 including side trimming means for cutting the edges of said sandwich after the said ribbon has set.

3. Apparatus of claim 1 including spray means for delivering said aqueous calcium sulfate hemihydrate slurry.

4. Apparatus of claim 1 having chopping means for glass fiber roving to deliver chopped glass fibers to the said first membrane as a descending cloud.

* * * * *